United States Patent [19]

Shaffer

[11] 3,783,962

[45] Jan. 8, 1974

[54] MECHANICAL LINKAGE FOR AUXILIARY DRIVE CONTROL IN VEHICLES
[75] Inventor: Walter M. Shaffer, Peoria, Ill.
[73] Assignee: Towmotor Corporation, Cleveland, Ohio
[22] Filed: Oct. 10, 1972
[21] Appl. No.: 296,222

[52] U.S. Cl.................................. 180/44 F, 74/479
[51] Int. Cl................................................ B60k 7/00
[58] Field of Search.......................... 180/6.2, 43, 44, 180/66, 82.4; 74/471, 479, 480 R; 192/13

[56] References Cited
UNITED STATES PATENTS
| 1,822,900 | 9/1931 | Messier................................ | 180/6.2 |
| 2,893,260 | 7/1959 | Lapsley................................ | 74/471 |
| 3,430,722 | 3/1969 | Budzich............................... | 180/44 M |
| 3,640,157 | 2/1972 | Schaefer.............................. | 180/6.2 X |
| 3,063,528 | 11/1962 | Wood................................... | 192/13 R |
| 3,542,173 | 11/1970 | Kratzenberg........................ | 192/13 R |
| 3,702,648 | 11/1972 | Mori.................................... | 192/13 R X |

Primary Examiner—Kenneth H. Betts
Assistant Examiner—T. L. Siemens
Attorney—Joseph L. Strabala

[57] ABSTRACT

By employing a pivoted bellcrank having one end connected to a transmission control lever in a vehicle a linkage-valve arrangement can provide automatic directional control for an auxiliary drive when connected to the other end of the bellcrank without complex mechanisms. This arrangement includes a fulcrum bar reciprocally mounted in a guide having one end connected to the bellcrank and a fulcrum pin at its opposite end, a control lever having an elongated slot engaged on the pivot pin with a valve mounted so its cylindrical spool axis is normal to the reciprocal movement of the fulcrum arm with the control lever connected to valve spool whereby the position of the fulcrum arm will automatically determine the direction of valve movement when the control lever is actuated.

4 Claims, 5 Drawing Figures

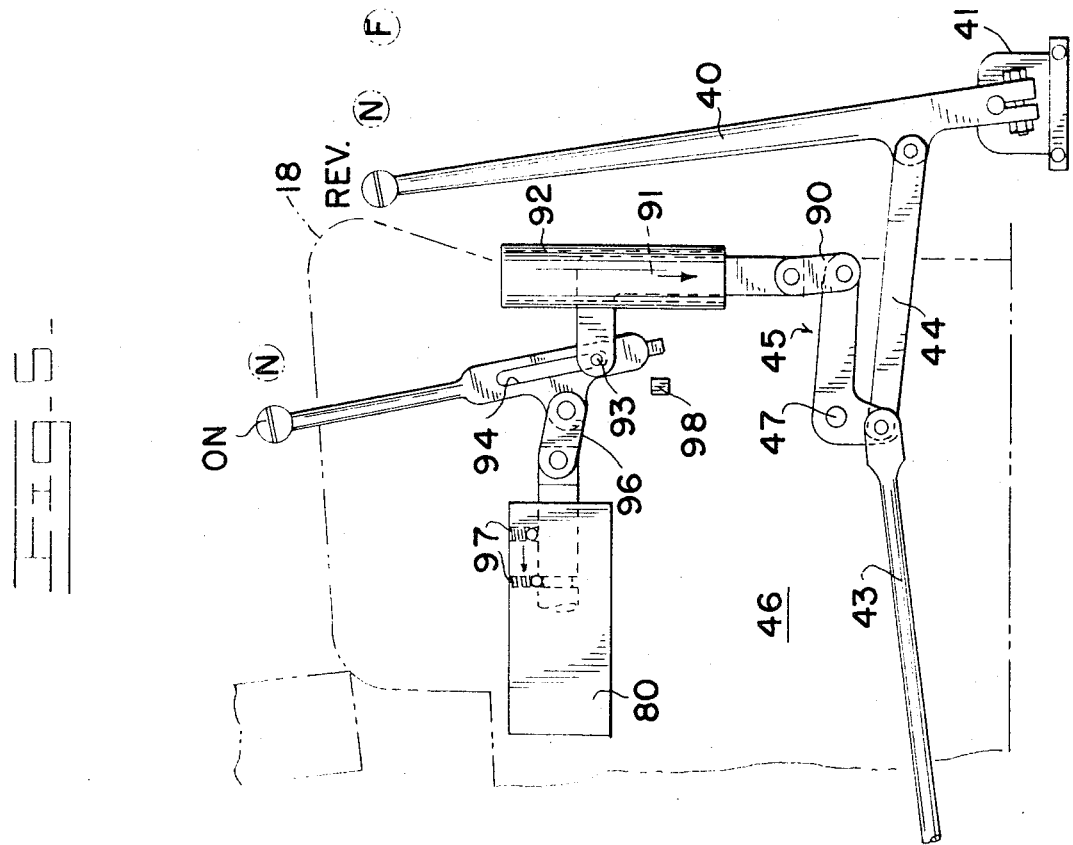
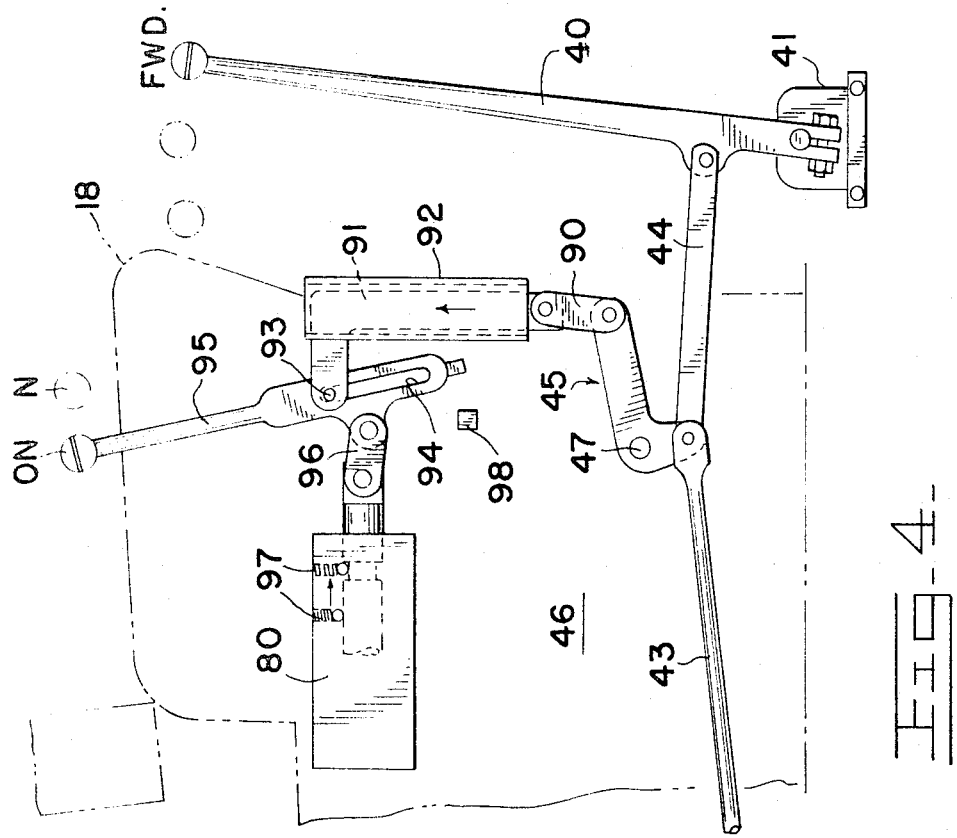

MECHANICAL LINKAGE FOR AUXILIARY DRIVE CONTROL IN VEHICLES

BACKGROUND OF THE INVENTION

A number of auxiliary hydrostatic drives are currently available providing limited four wheel drive capability to vehicles having drive trains with only two wheel drive. Such systems often use an engine driven pump to supply pressurized hydraulic fluid to hydraulic motors mounted on dirigible wheel of the vehicle to provide this capability. Examples of such auxiliary drive systems are shown in U.S. Pat. No. 3,272,277 issued to Budzich and U.S. Pat. No. 3,458,005 issued to Malm et al.

Systems for synchronizing the direction of auxiliary drive with the normal drive train of the vehicle, are usually complex, as will be apparent from a perusal of the foregoing patents.

The instant invention has as an object a simple mechanical linkage and valve arrangement which greatly reduces both cost and the complexity of systems for controlling the direction of auxiliary hydraulic drives in lower speed vehicles.

SUMMARY OF THE INVENTION

A mechanical linkage and valve arrangement for coordinating the direction of auxiliary hydraulic drives in vehicles having transmissions controlling its two wheel drive train includes a support with a bellcrank pivoted thereon having one end connected to the controls of the transmission and the opposite end connected to a fulcrum bar reciprocally mounted in a guide and having a fulcrum pin slidably mounted in a slot of a control lever connected to a valve controlling the auxiliary drive whereby the position of the fulcrum pin in the slot will condition the direction of valve movement based on the direction of the transmission drive of the vehicle so the auxiliary drive is automatically coordinated in direction with the main drive train.

BRIEF DESCRIPTION OF THE DRAWINGS

The invention will be better understood by reference to the drawings wherein:

FIGS. 4 and 5 illustrate the simple mechanical control linkage in forward and reverse conditions for controlling direction of the auxiliary drive system in conjunction with the transmission drive direction of the conventional drive train of the lift truck illustrated in FIG. 2.

DESCRIPTION OF AN EMBODIMENT

Figure 1:
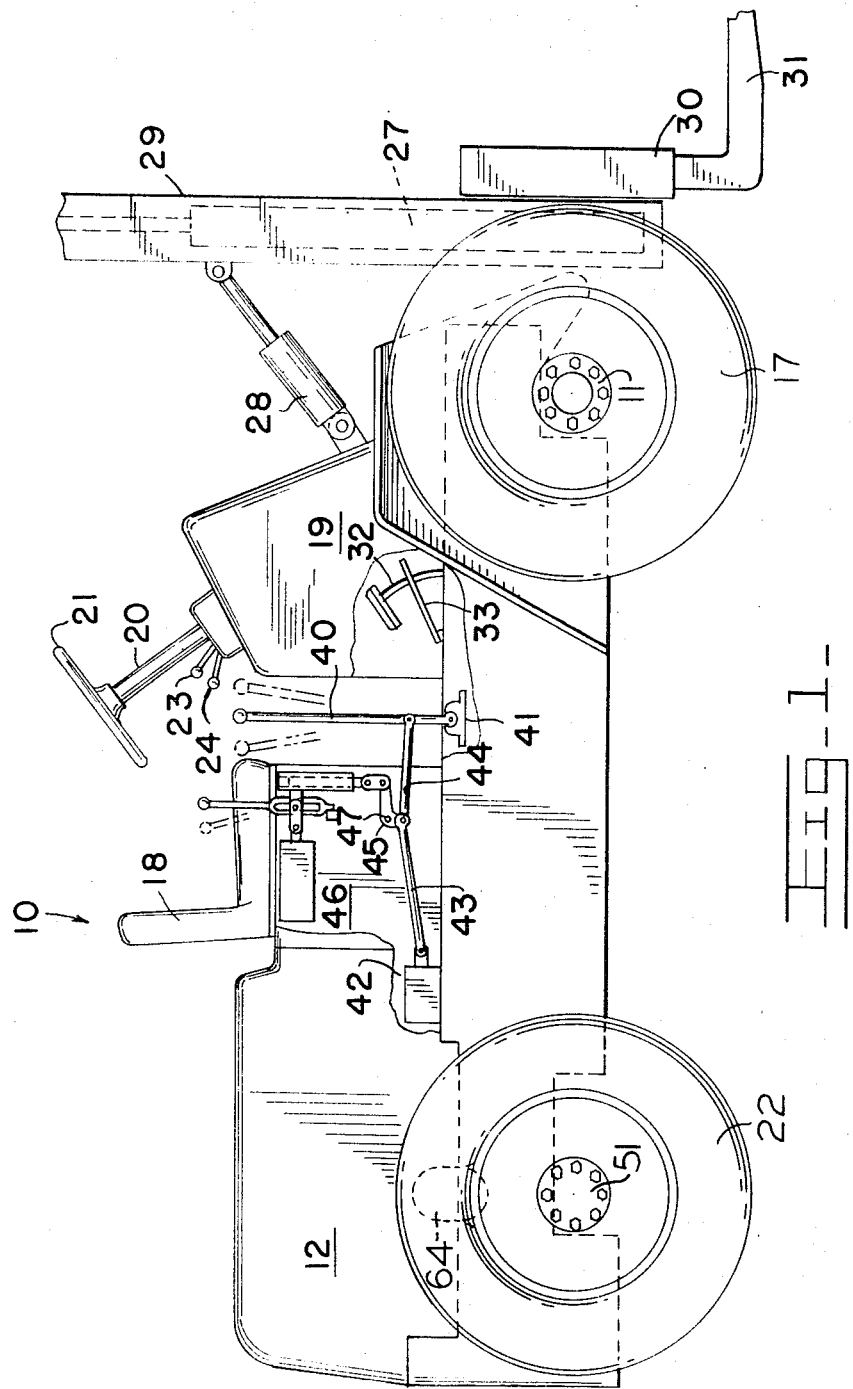
FIG. 1 is an elevation of a four wheel lift truck with the auxiliary drive features incorporated therein.
Figure 2:
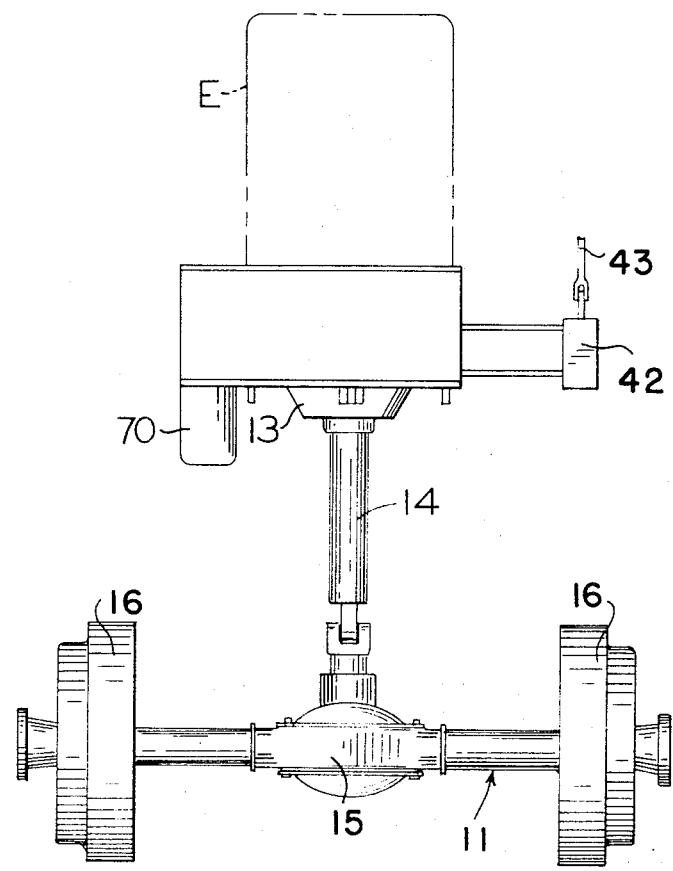
FIG. 2 is a plan of the conventional drive train in the lift truck illustrated in FIG. 1 with the engine indicated with broken lines.

In FIG. 1 a lift truck 10 is illustrated which uses a conventional front wheel drive system best shown in FIG. 2. An engine E (indicated by broken lines in FIG. 2) is mounted over the rear axle 51, under hood 12, with the engine output shaft connected in a bell housing of a hydrostatic transmission 13 to drive the input of the transmission. The output of the hydrostatic transmission is connected to the front axle by a torque tube 14 through a differential 15. At the outboard ends of the axle, final drive assemblies 16 are attached to provide the reduction gearing through which front wheels 17 are driven. A suitable hydrostatic transmission for this type of lift truck is illustrated in U.S. Pat. No. 3,486,335 issued to Kern et al. Such a transmission offers a selction of nearly infinite speed ratios between its input and output within the speed range of the transmission and therefore is a preferred drive train in lift trucks because of this feature.

Centrally located on the lift truck is an operator's seat 18 with an adjacent steering wheel 21 and steering column 20 mounted in a pedestal 19 located forward of the seat through which the rear dirigible wheels 22 of the lift truck are maneuvered to steer the lift truck.

On the pedestal 19 a lift control lever 23 connected to a lift control valve 25 is mounted, along with a tilt control lever 24 which is connected to a tilt control valve 26. These valves when actuated respectively operate the mast cylinders 27 and the tilt cylinders 28 for controlling a mast 29 and a carriage 30 with forks 31 that are reciprocated vertically on the mast structure in a conventional manner when the lift and tilt levers are operated.

Adjacent to the base of the pedestal are the brake pedal 32 and the engine accelerator pedal 33 providing the engine controls for the movement of the vehicle.

On the frame of the lift truck between the pedestal and seat is a transmission control lever 40 that is pivoted on a bracket 41 attached to the frame. Fore and aft movements of this lever will position the spool of transmission valve 42 through rod linkages 43 and 44 having their continguous ends commonly connected to one end of a bellcrank 45 mounted on pivot pin 47 on seat support structure 46. The transmission lever, shown in a neutral position in FIG. 1, can be advanced forwardly to select a forward vehicle speed and rearwardly to select a reverse speed by positioning the spool of the transmission valve 42 for the appropriate speed. Bellcrank 45 forms part of the special mechanical control system for the rear wheel auxiliary drive system which will be discussed subsequently.

By providing drive motors (illustrated in FIG. 3) on dirigible wheels 22 a four wheel drive capability is obtained. In the instant invention specially designed wheel drive units 49 are provided which can be swingably mounted at the ends of the rear axle 51 by a king pin 52 so a spindle 53 will support an associated rear wheel rotor 22a on wheel bearings 54 and 55. Above the spaced ears of each drive unit, pivotally pinned to the ends of the rear axle with the king pin, a stub shaft 56 is journalled in the housing 50 on bearings 57 with a pinion gear 58 keyed to its outboard end and a spline formed on its opposite end. With the rotor 22a of the associated wheel journalled on the spindle and connected to a drum 60, which encircles a portion of the housing of the wheel unit, an internal ring gear 59 in the drum meshes with the pinion and drives the rotor through power supplied to the stub shaft. A seal 61 between the drum and the housing prevents the ingress of dirt into the reduction gear drive formed by the pinion and the ring gear.

Figure 3:
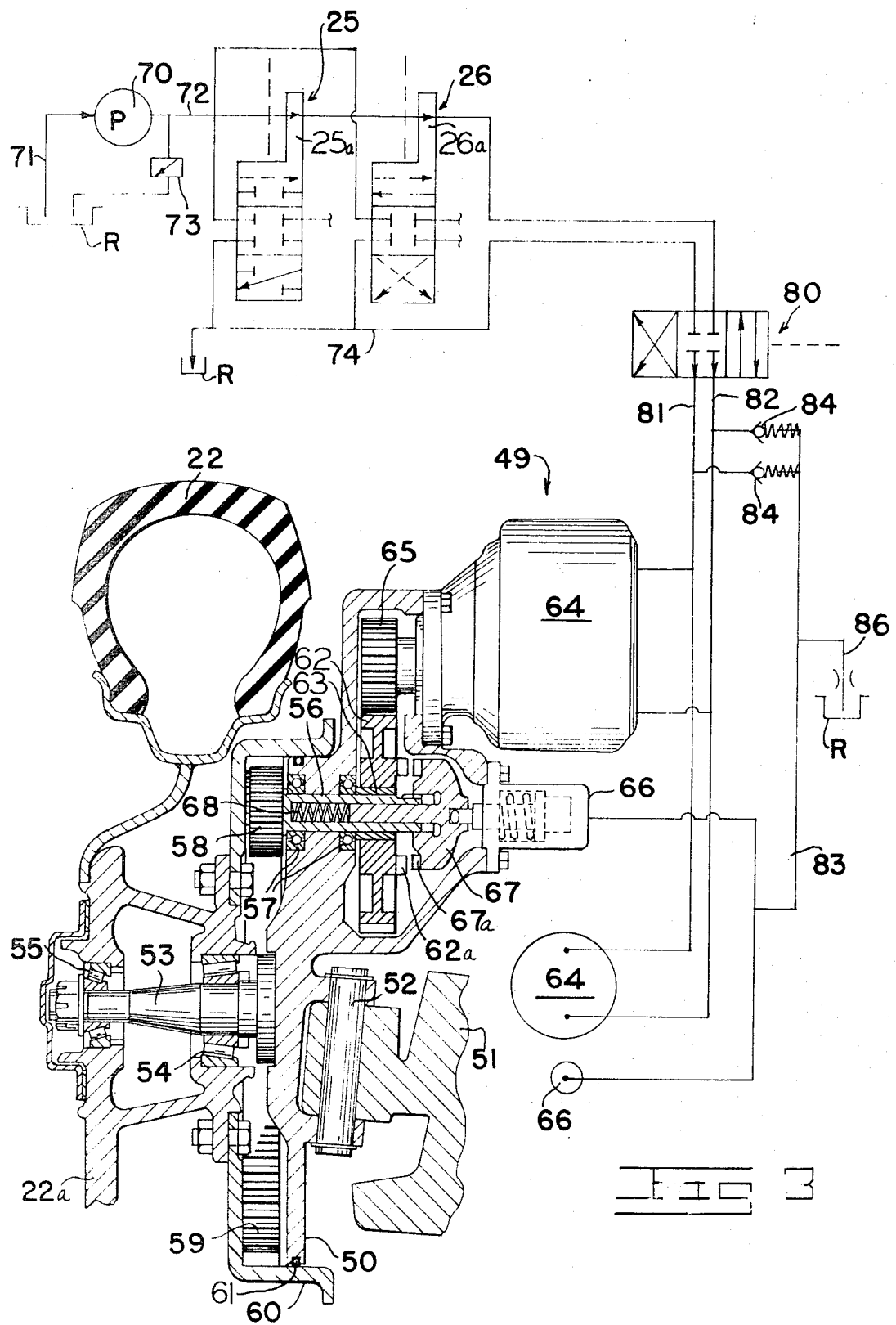
FIG. 3 is a section of a hydrostatic wheel drive unit, with parts broken away, used to replace the normal dirigible wheels of the lift truck illustrated in FIG. 1 to provide a four wheel drive capability.

A reduction gear 62 is mounted on stub shaft 56 to free-wheel on its bearing 63 within the housing 50 and meshes with a drive pinion 65 connected to the output shaft of a hydraulic motor 64 mounted on the upper portion of the housing so its drive pinion can be inserted through an aperture therein, as can be seen in FIG. 3. The hydrostatic motor can be selected from commercially available, positive displacement hydraulic motor units with internal reduction gearing. Since these units can be driven in both directions by reversing the flow of hydraulic fluid supplied to them from a pressurized source, directional control can be obtained by valving the hydraulic fluid used to power them.

As can be seen in FIG. 3 the gear train is arranged so the hydraulic motor 64 is mounted well above king pin attachment and does not require a bulky housing. This arrangement limits interference with the axle 51 and adjacent parts of the vehicle during steering operations. As a result steering is not impaired by the unit when it is installed on the lift truck.

Since reduction gear 62 is mounted to free-wheel on the stub shaft 56 and is driven by the hydraulic motor 64, it must be physically connected to the stub shaft to drive wheel 22 through the latter's rotor and drum. To accomplish the necessary connection a simple toothed clutch disc 67 is telescopically mounted on the splined end of the stub shaft with a mating internal spline and so its mandrel end is received in a blind counterbore in the stub shaft which contains spring 68. Cooperating teeth 62a are formed on the adjacent face of the reduction gear 62 and when teeth 67a of the clutch disc are moved into engagement therewith, compressing spring 68, a drive train between the hydraulic motor and the wheel is established. This simple gear arrangement and clutch connection takes a minimum amount of space and can be built economically.

A spring loaded cylinder 66 has a plunger which engages the outboard end of the clutch disc 67, mounted on the housing 50 so its plunger can move the teeth of the clutch disc and reduction gear into engagement when it is pressurized by hydraulic fluid. When the cylinder is depressurized the spring 68 disengages the clutch. Since both wheel units are similar only one has been described in detail in the above description.

In the schematic of the hydraulic circuitry illustrated in FIG. 3, the engine driven pump 70 for the lift and tilt circuits is connected to a hydraulic reservoir R through intake 71 and supplies hydraulic fluid under pressure to the lift valve 25 and the tilt valve 26 via supply line 72. A relief valve 73 controls the maximum pressure in the circuit, and drain line 74 also connected to these valves forms a return to reservoir for exhaust hydraulic fluid.

Both valves 25 and 26 have a secondary control spool 25a and 26a respectively (schematically illustrated) through which a branch of supply line 72 is serially connected to directional valve 80 of the auxiliary drive. When either the lift or tilt valves is operated the supply of pressurized fluid to directional and control valve 80 is interrupted and therefore the lift and tilt circuits have priority on the output of pump 70. The directional and control valve is also connected to reservoir through line 74 to return exhaust hydraulic fluid.

Directional and control valve 80 is commonly connected to the hydraulic motors 64 on wheel units 49 with parallel circuitry formed by lines 81 and 82. Thus when the spool of the directional valve is shifted one of these lines will be pressurized by pump 70 and the other will return exhaust fluid from the motor 64 to the reservoir. A separate clutch line 83 is commonly connected to the two clutch hydraulic cylinders 66 and also to lines 81 and 82 through one-way check valves 84. As a result of this connection, if either line 81 or 82 is pressurized the two clutches will be automatically engaged. A small orifice 86 connects clutch line 83 to reservoir so that the clutches will release if neither of lines 81 or 82 is pressurized.

The above hydraulic circuitry arrangement provides the priority control for the output of pump 70 and the direction control of the auxiliary drive, i.e., coordination with the direction of the main drive train is automatically obtained by a special mechanical linkage. This mechanical linkage is best shown in FIGS. 4 and 5 and bellcrank 45 forms a part thereof, as previously indicated. As can be seen in the drawings, transmission control lever 40 is linked to one end of the bellcrank and will change the position of the other end which is connected by a clevis 90 to a fulcrum arm 91 which is reciprocally mounted in a vertical slide tube 92 so its position will be controlled by the position of the bellcrank. With the transmission lever in neutral the fulcrum pin 93 of the arm is in axial alignment with the cylindrical axis of the valve spool of valve 80 and located in a slot 94 of the auxiliary drive control lever 95. The drive lever has a clevis 96 connecting it to the spool in valve 80 and all the joints and the fulcrum pin are all in alignment with the cylindrical axis of the spool in the neutral transmission position, illustrated in FIG. 1. As a result, rearward movement of the auxiliary speed control lever will not operate the directional valve 80 of the auxiliary drive.

If the transmission lever is placed in the forward mode, the fulcrum pin is moved upwardly and out of alignment with the spool of valve 80 (See FIG. 4). In such a situation rearward movement of the auxiliary speed control lever will move the spool of this direction control valve for forward auxiliary drive. However, if the transmission control lever 40 has been in the reverse position (see FIG. 5) the fulcrum pin would have been lowered below the aligned position and the directional valve would have been shifted in the opposite direction giving reverse auxiliary drive. It should be noted that if the transmission control lever is shifted from forward to reverse during an auxiliary drive condition the auxiliary drive circuits would be neutralized as the fulcrum pin would pass through the "aligned position" returning lever 95 to neutral (N). Spring loaded ball arrangements 97 cooperate with a groove in the spool of valve 80 to hold the auxiliary drive in the "on" position when set with lever 95. A stop 98 prevents this lever from being pushed forward of the neutral position and the same rearward movement of this control lever gives auxiliary drive for the forward and reverse modes.

The aforedescribed linkage automatically sets the auxiliary drive system for forward or reverse drive, depending on the direction of operation of the main drive train and automatically neutralizes the auxiliary drive when the main drive train is neutralized.

What is claimed is:

1. In a vehicle having a transmission in its main drive train and an auxiliary hydraulic drive for its dirigible wheels, a mechanical linkage and control valve arrangement comprising:
   a support;
   a bellcrank pivoted on said support having one end connected to the forward reverse controls of the transmission;
   a fulcrum bar reciprocally mounted in a guide having one end linked to the other end of said bellcrank, said fulcrum bar having a fulcrum pin at its opposite end;

a valve means having a spool connected to control the direction of pressurized fluid flow in the auxiliary hydraulic drive, said valve means mounted so the cylindrical axis of its spool is normal to the reciprocal movement of said fulcrum bar and adjacent thereto; and a control lever linked to said valve spool and having an elongated slot therein in which said pivot pin is received whereby movement of said bellcrank by said control of said transmission will position said fulcrum pin in said slot so movement of said control lever will automatically shift said valve spool to cause the direction of the auxiliary drive to synchronize with the direction of the vehicle.

2. The mechanical linkage and control valve arrangement defined in claim 1 wherein the transmission is a hydrostatic transmission.

3. The mechanical linkage and control valve arrangement defined in claim 1 wherein the fulcrum pin and the connections of the control lever with the valve spool are aligned with the latter's cylindrical axis when the transmission controls are in a neutral position and said fulcrum pin is centered in the elongated slot whereby movement of the control lever will not actuate said valve until said fulcrum pin is moved out of said alignment.

4. The mechanical linkage and control valve arrangement defined in claim 1 wherein the valve includes a detent means which holds the valve spool in at least one preselected position when moved thereto by the control lever.

* * * * *